United States Patent [19]
Galli

[11] Patent Number: 5,139,046
[45] Date of Patent: Aug. 18, 1992

[54] FLOATING PISTON LIKE VALVE FOR HIGH-PRESSURE REDUCERS

[75] Inventor: Rosaria Galli, Genoa, Italy

[73] Assignee: Rosaria Galli & C.s.a.s., Italy

[21] Appl. No.: 704,318

[22] Filed: May 22, 1991

[30] Foreign Application Priority Data

Jun. 11, 1990 [IT] Italy .................. 12473 A/90
Nov. 2, 1990 [IT] Italy .................. 12538 A/90

[51] Int. Cl.⁵ .................................. G05D 16/06
[52] U.S. Cl. .................................. 137/505.42
[58] Field of Search ............. 137/505.18, 505.42, 137/375, 505.37; 251/332

[56] References Cited

U.S. PATENT DOCUMENTS

| 2,938,539 | 5/1960 | Holmes | 137/505.42 |
| 3,552,426 | 1/1971 | Hester | 137/375 |
| 3,586,037 | 6/1971 | Zimmer | 137/505.18 |
| 4,696,320 | 9/1987 | Bull | 137/505.42 X |

Primary Examiner—Stephen M. Hepperle
Attorney, Agent, or Firm—Rosenman & Colin

[57] ABSTRACT

Floating piston-like valve member for pressure reducers, comprising a metallic body having a hollow stem and a disc-shaped planar head, the body having an outer portion exposed to high pressure and coated with plastics material which is mechanically resistant to high pressures and, at the same time, is capable of acting as a seal.

10 Claims, 1 Drawing Sheet

5,139,046

FLOATING PISTON LIKE VALVE FOR HIGH-PRESSURE REDUCERS

BACKGROUND OF THE INVENTION

In the field of pressure-reducing devices or the like, particularly for high pressures, axially slidable valves are used which are constructed in the form of a metallic member which is turned to form a stem having an enlarged head provided with a recessed seat for fixedly embedding therein a special material insert designed to establish a tight seal against an outlet nozzle. It has been noted that practically this solution has a high manufacturing cost, since the application of said rubber insert by molding requires a previous sanding and pickling treatment and the application of a special primer glue to ensure a reliable fastening capable of withstanding high possible operation due to pressure seepage and action, and a comparatively long molding period as required to vulcanize rubber. The use of rubber, due to the particular molding requirements thereof, entails a further drawback because, upon molding said rubber insert, the axial bore in the stem, needed to create a pressure balance is liable to be obstructed; therefore, said hole shall be made in a final, expensive separate operation.

Since these articles shall be manufactured on mass-production, the existing solutions have shown to be too complicated and expensive, and this fact has urged the development of changes intended to ensure the utmost manufacturing economy and an improved functionality of the article, particularly in case of high pressures.

OBJECT OF THE INVENTION

Bearing in mind the previously mentioned conventional art, the object of the present invention is to provide a valve of the type described above, characterized in that it permits a simplification in the manufacturing operation by the construction of a metallic valve member having an outer portion exposed to high pressure, said outer portion being entirely and uninterruptedly coated with resilient plastics material capable of fulfilling the task of said sealing rubber insert, which may be thus eliminated. It is also to be noted that the rubber insert is notoriously liable to detachment and seepage because of its exposure to high pressure. Therefore, the invention avoids the complicated application of the insert, while the perfect and reliable anchorage of our coating is ensured by provisions which do not complicate the manufacture, rather they make it easier because as a result thereof the axial bore in the metallic member can be performed while turning said member and before molding the coating thereon, with no risk of obstruction. The valve coating proposed by the present invention, is free from any interruptions or junctions in the outer portion exposed to high pressure, and therefore resists seepage or detachment caused by the action of the same high pressure. Therefore, the application of the present invention avoids the complicated and unsafe use of the rubber insert and allows the use of a resilient plastic material, instead of the rubber one, with all the consequent benefits due to the much easier moulding process.

Furthermore, the above overcomes the problem of the lower adhesion property of plastic, compared with rubber, allowing its use.

As a further consequence, the plastic moulding permits the axial bore to be made in the metallic body, while turning said member and before moulding the coating thereon, with no risk of obstruction, the risk of detachment or the like. Moreover, since the devices comprising floating valve members of the type concerned herein must comply with increasingly strict requirements, also under the viewpoint of the operative precision, further technical improvements have been devised to achieve a more accurate top and bottom centering and guiding action on the floating and axially movable valve member, thus preventing it from misaligning, which inconvenience could either impair or delay the perfect closure of the system.

Substantially, said further improvements comprise, at the top, around the head of the floating piston-like valve member, a guiding collar adapted to slide accurately but freely along the cylindrical surface of the bore of the reducer and provided with peripheral tangential bevels permitting a free passage of air, and at the bottom, an inverted cup-shaped member fitted on a cylindrical protrusion which is integral with the bottom of the reducer body, said member being provided with a shoulder of suitable diameter for enclosing an O-ring co-operating with the lower portion of the coated stem of the floating valve member. Said O-ring can be thus mounted in advance, thus avoiding the tiresome operation of passing it through the narrow hole of a seat formed integrally in the bottom of said body.

Therefore, the invention relates generally to a floating piston-like valve member for pressure reducers and similar devices intended especially for heavy operational and high pressure requirements, provided with a plurality of mechanical improvements comprising the coating with plastics material of the portion of the metallic body constituting the valve member exposed to high pressure, said coating substituting for the usual rubber pad insert. Said coating is given a perfect anchorage by means of end collars which are also intended to avoid (together with the use of plastics rather than rubber), during the molding step, the obstruction of the axial through-hole in the valve member. In order to achieve an improved centering of said member, the invention provides, around the piston head, a guiding collar capable of sliding along the cylindrical surface of the bore of the reducer, said collar being formed with peripheral tangential bevels permitting the free passage of air. At the bottom, for co-operation with the stem of said valve, the invention provides an inverted cup-shaped member which is fitted on a cylindrical protrusion integral with the bottom of the reducer body, said member being provided with a shoulder of suitable diameter for enclosing an O-ring co-operating with the lower portion of the coated stem of the floating valve member. Finally, said valve member is provided with a through-hole having two diameters, i.e. an upper larger guidance hole and a lower smaller balancing hole, the assembly being characterized in that said cup-shaped member is held in place by a valve return spring acting on a suitable annular rim thereof, the top end of said spring bearing against the lower face of the collar which coats the periphery and lower side of the floating piston head.

BRIEF DESCRIPTION OF THE DRAWINGS

The accompanying drawing shows, as a non-limiting example, in a considerably enlarged scale, an embodiment of the article according to the invention. In the drawing.

DETAILED DESCRIPTION OF A PREFERRED EMBODIMENT

Figure 1:
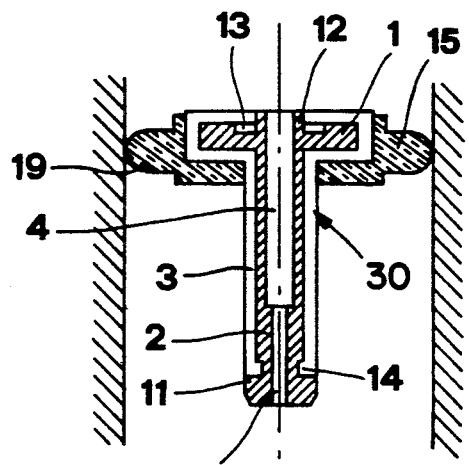
FIG. 1 is an axial sectional view of the piston-like valve member alone, of the type being discussed herein, entirely coated with resilient plastics material, provided with the complementary guiding collar proposed by the invention and emphasized by a different hatching.
Figure 2:
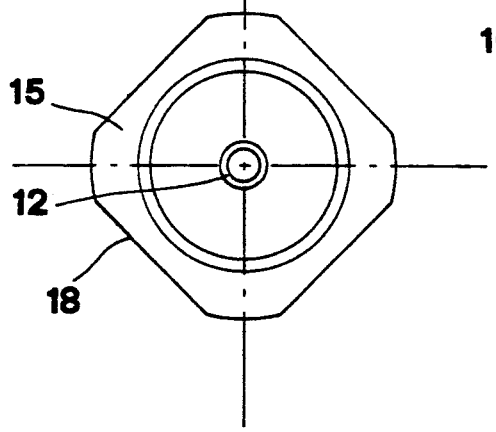
FIG. 2 is a plan view of FIG. 1 showing the peripheral tangential bevels which permit the required flow of the high pressure gas.

As clearly shown in the Figures, according to the basic improving characteristics to be defined and claimed herein, the floating piston-like valve member according to the invention comprises a turned metallic body 30 including an upper head 1 of larger diameter and a lower integral stem 2 of smaller diameter, said portions being provided thereover with a molded coating 3 of resilient plastics material. The valve member is provided with an axial through-hole of two diameters 4 and 5, having a pressure-balancing function and a stem-guiding function for a piston-shaped pusher 6 acting against a membrane 7 secured in the upper portion of the pressure reducer and urged by the calibration spring 8.

The plastics coating 3 has suitable mechanical characteristics ensuring a pressure-tight seal both against the outlet nozzle 9 and against the balancing O-ring 10, and, according to one of the substantial characteristics of the invention, the stem 2 is formed at the free end thereof with a shoulder 11 having the same diameter which is provided for the coated stem, so as to function as a limit shoulder upon molding the plastics coating thereover. For the same purpose, the top side of the head of the valve member comprises a protruding central collar 12 against which the coating material closes with the aid of the circular plastics reinforcement groove 13 formed in the head 1. Similarly, the stem 2, adjacent the shoulder 11, is provided with an annular groove 14 which will form, upon the molding of the plastic coating, a terminal reinforcement ring for the coating 3 which, if desired, may be additionally anchored to the head 1 of the piston-like member by forming through-holes in the head which are parallel to the main axis of said piston-like member, said holes permitting an integral junction of the upper and lower plastic coating layers on said head. Finally, in order to prevent said head from slapping, provision is made of a collar 15 made of rigid material and provided with a recessed seat for embedding said head perfectly. The outer diameter of the collar 15 is such as to permit said collar to slide accurately and freely along the cylindrical surface of the internal bore 16 of the body 17 of the reducer and, therefore, said collar can guide the valve member perfectly during its axial movement, thus avoiding absolutely any misalignment and slapping thereof. In order to permit the required circulation of pressurized gas, the collar 15 is formed with peripheral tangential bevels 18 and rounded corners 19 which, inter alia, reduces eventual friction. Said collar 15 may be mounted on the piston head either in the assembling or the molding step; it is also to be noted that the collar 15 has, inter alia, the function of retaining the resilient material which coats the piston-like member.

Similarly, in order to obtain an improved guidance at the lower portion of the stem 2 of the valve member and simultaneously a more suitable seat for the O-ring 10, the invention provides, on the bottom of the body 17 of the reducer, a cylindrical centering protrusion 20 whereon is fitted an inverted cup-shaped member 21 formed, at the bottom, with a protruding rim whereon a coil spring 22 bears, and at the top, with a shoulder 23 for retaining extensively an O-ring 10. By virtue of this provision, said O-ring may be mounted easily, together with an extrusion-preventing washer 24, thus avoiding of mounting said O-ring through a small-sized hole.

Moreover, it is to be noted that the collar 15 may also be formed integral with the piston-like member by modifying and enlarging the shape of the turned metallic member and by giving the resilient coating 3 a general configuration identical to that of the piston-like member together with the collar insert.

Figure 3:
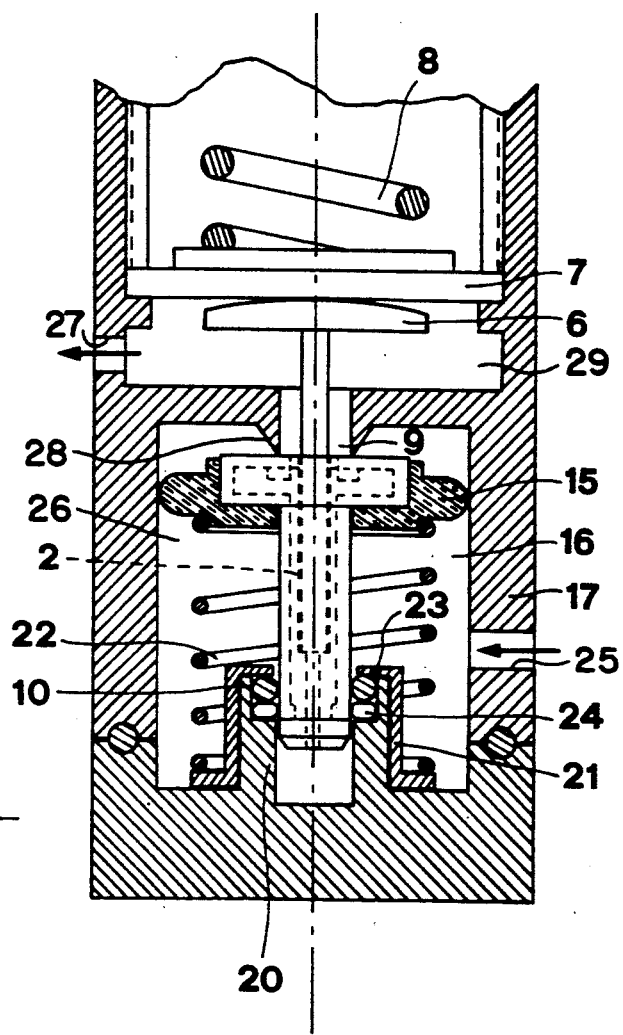
FIG. 3 is an axial sectional view of the lower portion of a pressure reducer to which the present invention is referred, mounting therein the piston-like valve member coated and provided with a collar as from FIG. 1, the stem of said valve member being guided at the bottom by a cup-shaped member fitted on a suitable cylindrical centering protrusion which is adapted, additionally, to accommodate a balancing O-ring, said guiding cup-shaped member being formed with an enlarged retaining shoulder, the assembly being held in place by a return spring of said reducer.

In FIG. 3, the high pressure reaches the high pressure chamber 26 through the inlet conduit 25 while the outlet conduit 27 of the reduced pressure chamber 29 is closed.

After an initial step, during which the pressure reaches the chamber 29 under the membrane 7, through the nozzle 9, and increases until it overcomes the tension applied by the spring 8, the valve reaches the closing position. At this stage, the upper part of the valve contacts the nozzle edge 28, ensuring, thanks to its coating, a pressure-tight seal.

In this situation, the high pressure fluid completely fills the high pressure chamber 26, which is delimited, on one side by the edge 28 of the nozzle 9, and on the other side by the O-ring seal 10.

The same parts, 28 and 10, delimit the exposed portion of the valve that is subjected to the high pressure.

This exposed portion is completely coated, without any interruption, by the resilient plastic and, therefore, is fully exempt from the risk of seepage or detachment.

The other working stages of the pressure reducer are not described, as the present invention relates only to the valve element and its centering and holding parts, both of which fulfill the most significant action when fully subjected to the high pressure.

The embodiment of the invention which has been described and shown is liable to changes and improvements within the basic principle defined by the invention.

What is claimed is:

1. In a high pressure reducer, a floating valve arrangement comprising: a piston-like valve member including
   (a) a metallic body having
      (i) an elongated stem extending along a longitudinal axis, and having an outer surface,
      (ii) an enlarged disk-like head integral with the stem and extending radially of the axis, said head having upper, side and lower surfaces,
      (iii) a pair of opposite axial end faces,
      (iv) an annular collar integral with the head and extending axially away from the upper surface of the head to one of the axial end faces of the body, (v) an annular groove formed in the head and circumferentially surrounding the collar, (vi) a shoulder integral with the stem and extending axially from the stem to the other of the axial end faces of the body, said shoulder having an outer diameter, and (vii) an interior passage extending through the body between the axial end faces thereof; and (b) a molded coating of resilient synthetic plastic material extending uninterruptedly from the groove over all said surfaces to the shoulder of the body, said coating over the outer surface of the stem having an outer diameter commensurate to the outer diameter of the shoulder.

2. The arrangement according to claim 1, wherein the stem has an annular groove adjacent the shoulder; and wherein the coating extends between, and is received in, both said grooves.

3. The arrangement according to claim 1, wherein the passage includes a pair of passageways, one passageway having a larger internal diameter than the other passageway.

4. The arrangement according to claim 1, wherein the head is apertured with a plurality of holes extending axially between the upper and lower surfaces thereof, and wherein the coating also extends through the holes.

5. The arrangement according to claim 1, wherein the valve member includes a guide collar slidable in and along a high pressure chamber of the reducer, said guide collar having a recessed seat for snugly receiving the head, and an outer beveled peripheral edge that bounds a flow path with the high pressure chamber.

6. The arrangement according to claim 5, wherein the beveled peripheral edge has a generally square-shaped configuration with rounded corners.

7. The arrangement according to claim 1, wherein the arrangement further comprises a tubular projection in which the stem of the valve member is slidably mounted in a high pressure chamber of the reducer, an O-ring supported on the projection and sealingly engaging the outer surface of the stem, and a cup-shaped member mounted on the projection and having an annular flange engaging and holding the O-ring on the projection.

8. The arrangement according to claim 7, wherein the valve member includes a guide collar slidable in and along a high pressure chamber of the reducer, said guide collar having a recessed seat for snugly receiving the head; and wherein the cup-shaped member has a peripheral rim; and wherein the arrangement further comprises a spring having one end bearing against the guide collar and an opposite end bearing against the rim.

9. The arrangement according to claim 1, wherein the valve member includes a guide collar integral with the head and slidable in and along a high pressure chamber of the reducer.

10. The arrangement according to claim 1, wherein the arrangement includes a high pressure chamber having an inlet and outlet for respectively admitting and discharging a pressurized gas, and wherein the outlet has a valve seat against which the coating over the upper surface of the head sealingly abuts in a closed valve condition.

* * * * *